United States Patent [19]

Oshizawa

[11] Patent Number: 4,788,960
[45] Date of Patent: Dec. 6, 1988

[54] SOLENOID-VALVE-CONTROLLED FUEL INJECTION DEVICE

[75] Inventor: Hidekazu Oshizawa, Higashimatsuyama, Japan

[73] Assignee: Diesel Kiki Co., Ltd., Tokyo, Japan

[21] Appl. No.: 175,242

[22] Filed: Mar. 30, 1988

[30] Foreign Application Priority Data

Apr. 6, 1987 [JP] Japan .................. 62-082892

[51] Int. Cl.⁴ .................................... F02M 39/00
[52] U.S. Cl. ......................... 123/506; 123/503; 123/494; 123/357; 123/458
[58] Field of Search ............ 123/458, 494, 506, 503, 123/357, 358, 359; 73/119 A

[56] References Cited

U.S. PATENT DOCUMENTS

| | | | |
|---|---|---|---|
| 4,395,987 | 8/1983 | Kobayashi et al. | |
| 4,495,915 | 1/1985 | Shinoda | 123/458 |
| 4,505,240 | 3/1985 | Shinoda | 123/458 |
| 4,597,369 | 7/1986 | Yasohara | 123/458 |
| 4,603,669 | 8/1986 | Takemoto | 123/458 |
| 4,610,233 | 9/1986 | Kushida | 123/458 |
| 4,653,447 | 3/1987 | Linder | 123/458 |
| 4,667,633 | 5/1987 | Stumpp | 123/494 |
| 4,706,629 | 11/1987 | Wineland | 123/494 |
| 4,714,068 | 12/1987 | Nagase | 123/458 |
| 4,718,391 | 1/1988 | Rembold | 123/357 |

FOREIGN PATENT DOCUMENTS

| | | |
|---|---|---|
| 53-99134 | 8/1978 | Japan . |
| 56-141026 | 11/1981 | Japan . |
| 57-91366 | 6/1982 | Japan . |
| 60-147544 | 8/1985 | Japan . |
| 61-268844 | 11/1986 | Japan . |
| 61-286541 | 12/1986 | Japan . |
| 61-286716 | 12/1986 | Japan . |

Primary Examiner—Carl Stuart Miller
Attorney, Agent, or Firm—Wenderoth, Lind & Ponack

[57] ABSTRACT

A fuel injection device for an internal combustion engine has a fuel pressurization chamber and a fuel chamber which are coupled to each other by a solenoid valve. The timing of fuel injection and the amount of fuel to be injected are controlled by selectively opening and closing the solenoid valve. Valve opening delay times of the solenoid valve are measured, and averaged when the rotational speed of the engine is in a prescribed speed range. The mean value of the valve opening delay times is used as a valve opening delay time for increasing or reducing the duration of a drive pulse for opening and closing the solenoid valve.

6 Claims, 4 Drawing Sheets

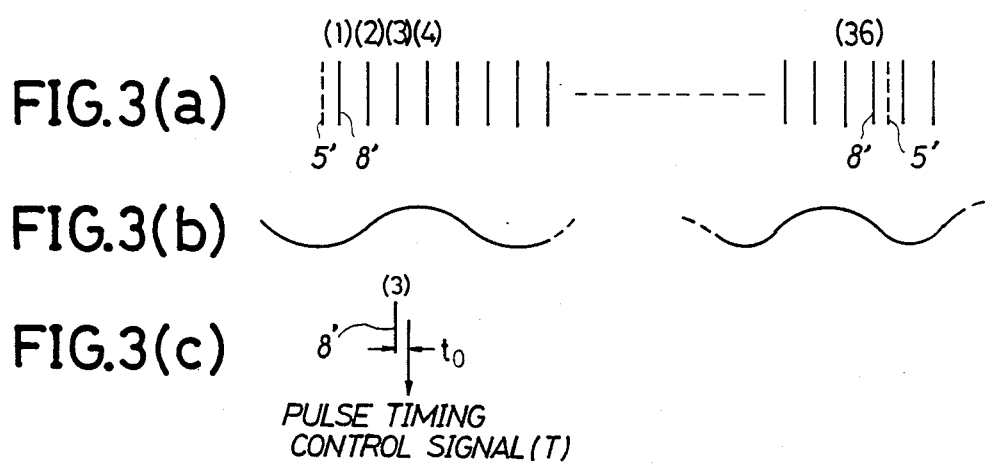
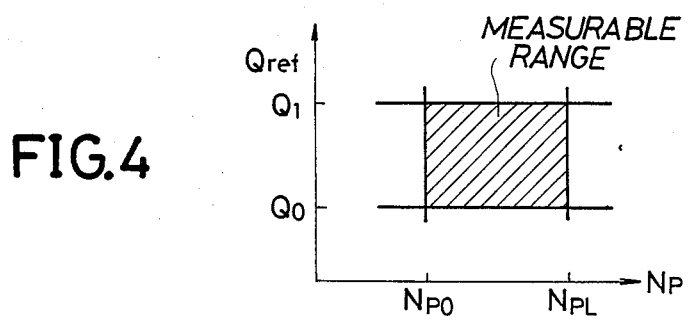
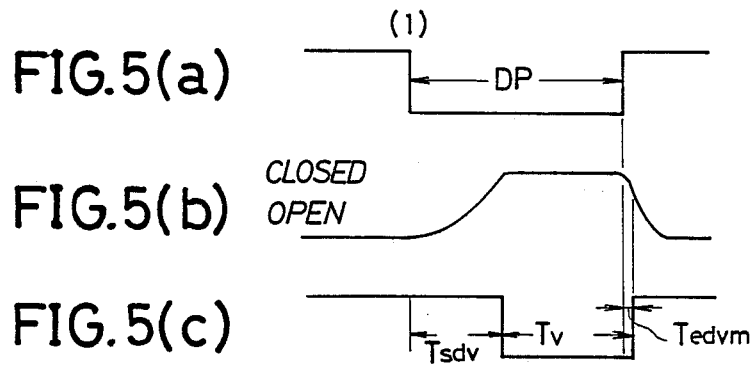

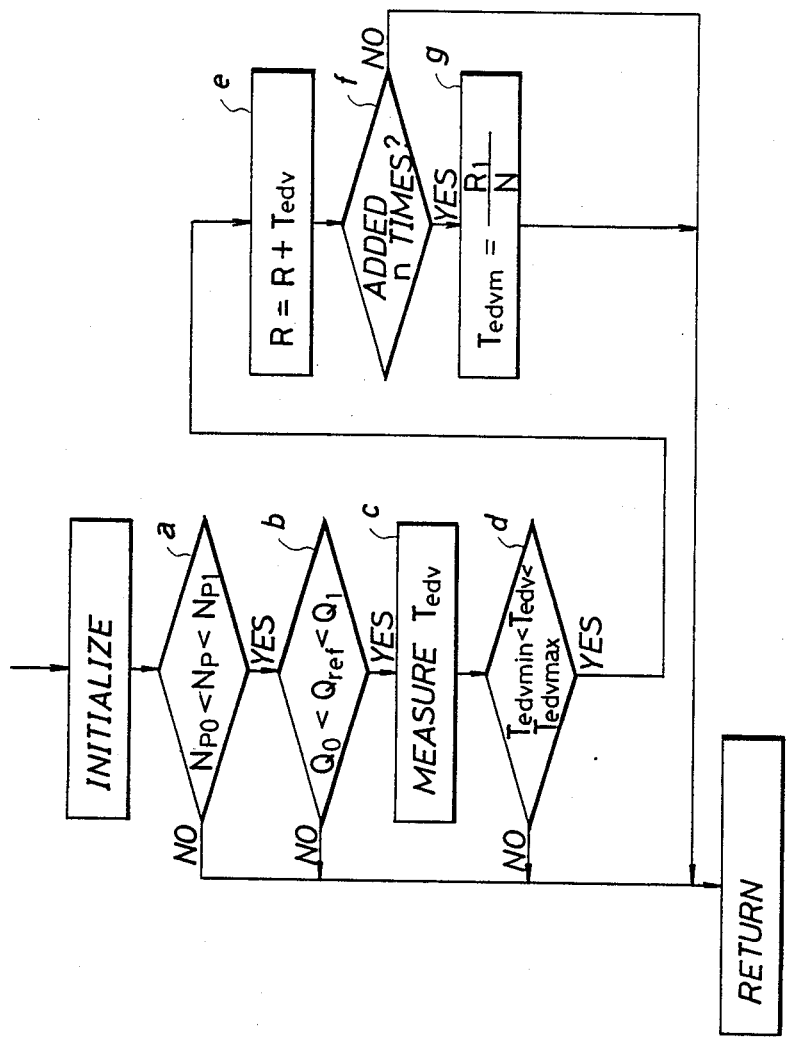

SOLENOID-VALVE-CONTROLLED FUEL INJECTION DEVICE

BACKGROUND OF THE INVENTION

The present invention relates to a fuel injection device for supplying fuel to the cylinders of an internal combustion engine, and more particularly to a fuel injection device having a pressurization chamber for pressurizing introduced fuel and a fuel chamber, the pressurization and fuel chambers being held in communication with each other by a solenoid valve which is selectively openable and closable for controlling fuel injection.

There is known a fuel injection device associated with an internal combustion engine, the fuel injection device having a pressurization chamber for pressurizing introduced fuel, a fuel chamber, and a solenoid valve by which the pressurization and fuel chambers are held in communication with each other, the solenoid valve being selectively openable and closable under the control of a signal indicative of operating conditions of the engine. This known fuel injection device controls the quantity of fuel to be injection and the timing of fuel injection without using a mechanism for controlling the quantity of fuel to be injection and a mechanism for controlling the timing of fuel injection (so-called "timer"). Various detected signals representative of the rotational speed of the drive shaft of a fuel injection pump, the temperature in the fuel chamber, the pressure in an intake pipe of the engine, the quantity of depression of the accelerator pedal, and the position of the top dead center of each cylinder are supplied to an electronic control unit which then calculates the timing of fuel injection and the quantity of fuel to be injected according to operating conditions of the engine for controlling the opening and closing of the solenoid valve.

The fuel injection control effected by a solenoid-valve-controlled fuel injection device is dependent on the timing at which the solenoid valve is opened and closed. Therefore, the valve opening/closing timing must accurately be controlled. With the aforesaid conventional fuel injection device, however, no special consideration is given to delay times that are present in opening and closing the solenoid valve. As a result, the timing of fuel injection and the quantity of fuel to be injected cannot be controlled to a nicety by the prior fuel injection device.

In order to eliminate the above drawback, it has been proposed to correct the duration (Tv) of a control pulse for driving a solenoid valve with a valve closing delay time (Tsdv) and a valve opening delay time (Tedv) and to apply a pulse having a duration (Dp=Tsdv+Tv−Tedv) as a valve driving pulse to actuate the solenoid valve for thereby obtaining a desired timing of fuel injection and a desired quantity of fuel to be injected.

The above proposed arrangement with the pulse duration correction is advantageous in that the period in which the solenoid valve is open is controlled by supplying the solenoid valve with a pulse having a pulse duration corrected in view of the valve closing delay time and the valve opening delay time.

The valve closing delay timd and the valve opening delay time are detected for each valve opening/closing cycle by respective measuring means. The solenoid valve is regarded as starting to be opened and closed when an inner valve and a valve casing of the solenoid valve are brought into and out of contact with each other. Thus, the solenoid valve itself serves as contacts. When the solenoid valve is opened, the inner valve bounces and hence the contacts are repeatedly turned on and off.

At times, a command for opening the solenoid valve is applied while the inner valve is bouncing. This phenomenon is more likely to happen as the rotational speed of the engine goes higher. As a consequence, the valve opening delay time cannot be measured precisely. The duration of a valve driving pulse computed using the inaccurately measured valve opening delay time is therefore inaccurate and so is the controlling of the quantity of fuel to be injected.

If a pre-measured valve opening delay time is used a fixed valve opening delay time, it would be impossible to correct the duration of a valve driving pulse as a function of a time-dependent change in the valve opening delay time.

On the other hand, if the valve opening delay time measured in a preceding valve control cycle is used in a present valve control cycle, the durations of valve driving pulses are subject to a relatively large variation as the degree of valve opening varies gradually when a valve opneing signal is issued. Consequently, the quantity of fuel to be injected cannot be controlled precisely.

SUMMARY OF THE INVENTION

It is a first object of the present invention to provide a solenoid-valve-controlled fuel injection device capable of accurately controlling the quantity of fuel to be injected while eliminating inaccuracies in the durations of valve driving pulses by accurately measuring valve opening times in relation to the rotational speed of an engine with which the fuel injection device is used.

A second object of the present invention is to provide a solenoid-valve-controlled fuel injection device capable of correcting the durations of valve driving pulses as a function of a time-dependent change in the valve opening delay time.

A third object of the present invention is to provide a solenoid-valve-controlled fuel injection device which can accurately control the quantity of fuel to be injected regardless of irregular durations of valve driving pulses.

In order to achieve the above objects, a fuel pressurization chamber and a fuel chamber are connected to each other by a solenoid valve, valve opening delay times of the solenoid valve are measured, and when the rotational speed of the output shaft of an internal combustion engine is in a prescribed speed range, the measured valve opening delay times are averaged. The solenoid of the solenoid valve is energized for a period of time which is given by subtracting the average valve opening delay time from the sum of a valve closing time and a valve closing delay time, for thereby controlling the opening and closing of the solenoid valve.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3(a) is a diagram showing the relationship between reference phase pulses and output pulses from a pulse generator;

FIG. 3(b) is a diagram showing a cam profile as developed;

FIG. 3(c) is a digram showing the timing of a signal (T) generated by a pulse timing control circuit;

FIG. 4 is a diagram of a range in which valve opening deley times are measurable;

FIG. 5(a) is a diagram showing the waveform of a valve driving pulse;

FIG. 5(b) is a diagram showing the timing of opening and closing of a solenoid valve actuated by a valve driving pulse;

FIG. 5(c) is a diagram showing valve opening and closing delay times; and

FIG. 6 is a flowchart of operation of an averaging circuit in the solenoid-valve-controlled fuel injection device.

DESCRIPTION OF THE PREFERRED EMBODIMENT

Figure 1:
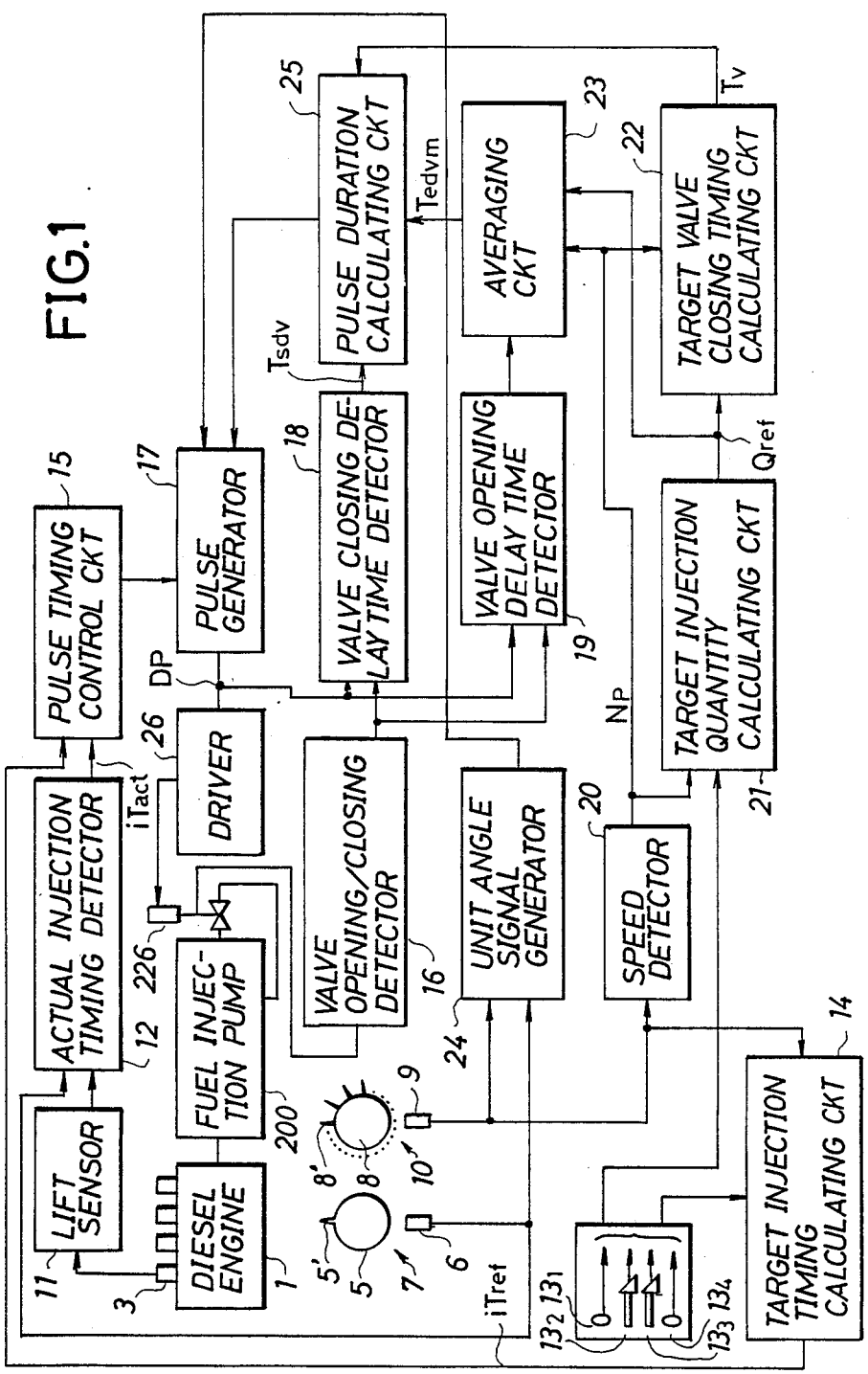
FIG. 1 is a block diagram of a solenoid-valve-controlled fuel injection device according to the present invention.

As shown in FIG. 1, a fuel injection pump 200 is actuated by an internal combustion engine 1 such as a diesel engine to feed fuel under pressure which is injected into the cylinders of the diesel engine 1 by fuel injection valves 3.

Figure 2:
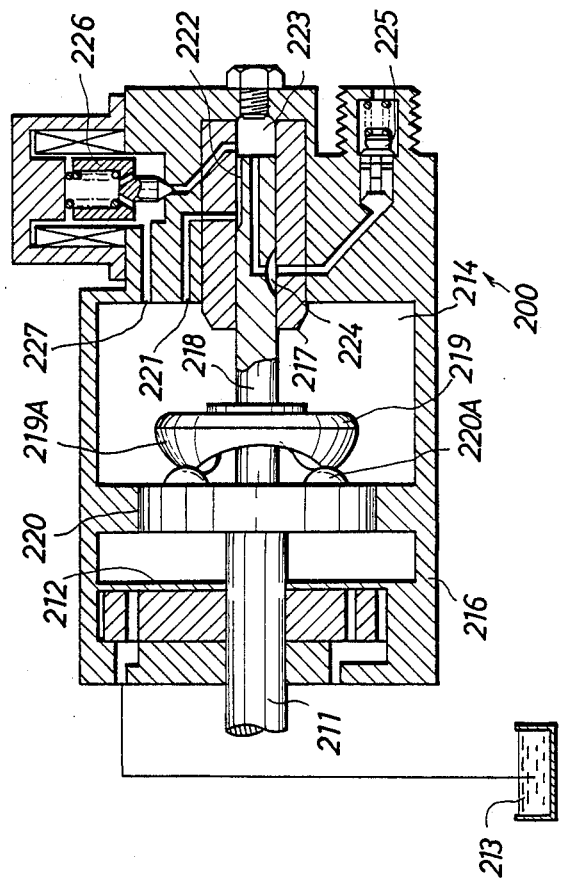
FIG. 2 is a cross-sectional view of a fuel injection pump in the solenoid-valve-controlled fuel injection device.

The fuel injection pump 200 has a drive shaft 211 (FIG. 2) coupled to the output shaft of the diesel engine 1, so that the drive shaft 211 can be driven in synchronism with rotation of the output shaft of the diesel engine 1. When the drive shaft 211 rotates, a feed pump 212 is driven to deliver fuel from a fuel tank 213 into a fuel chamber 214. The pressure of fuel in the fuel chamber 214 is proportional to the rotational speed of the drive shaft 211.

The fuel injection pump 200 has a pump housing 216 in which there is mounted a barrel 217 that is substantially bottomed as a cylinder, with a pump/distributor plunger 218 fitted in the barrel 217 in a fluid-tight manner. The plunger 128 and the drive shaft 211 are coupled for corotation but are slidable with respect to each other in the axial direction of the plunger 218. The plunger 218 includes a proximal portion on which a cam disc 219 is fixedly mounted. The cam disc 219 includes a cam surface 219A (see FIG. 3(b)) having as many cam lands as the number of the cylinders of the engine. A roller holder 220 is angularly adjustably supported in the pump housing 216, with the drive shaft 211 rotatably extending through the roller holder 220, and rollers 220A are rotatably supported on the roller holder 220. The cam surface 219A is pressed against the rollers 220A by a plunger spring (not shown). Therefore, by rotating the drive shaft 211 about its own axis, the plunger 218 is rotated and simultaneously axially moved back and forth as the rollers 220A relatively roll on the cam surface 219A for drawing in, pressurizing, distributing, and pressure-feeding the fuel.

More specifically, as the plunger 218 rotates and moves to the left (FIG. 2), the fuel in the fuel chamber 214 is drawn via a suction passage 221 and a suction groove 222 into a pressurization chamber 223 defined between the barrel 217, the tip end surface of the plunger 218, and the pump housing 216. Continued rotation and movement to the right of the plunger 218 pressurizes the fuel in the fuel chamber 223 and feeds the fuel under pressure from a distribution groove 224 communicating with the pressurization chamber 223 via a delivery valve 225 to the fuel injection valves 3 associated with the engine cylinders.

The pressurization chamber 223 and the fuel chamber 214 communicate with each other through a communication passage 227 having a solenoid valve 226 which selectively opens and closes the communication passage 227.

The solenoid valve 226 is openable and closable for controlling the injection of fuel in a fuel pressurization stroke during each reciprocating cycle of the plunger 218. When the solenoid valve 226 is closed, fuel starts to be pressurized and fed under pressure. When the solenoid valve 226 is opened, fuel pressurization is terminated. The time to start pressurizing fuel is controlled by the valve closing time, and the quantity of fuel to be injected is controlled by a period of time from the closing of the valve to the opening of the valve.

A reference phase sensor 7 (FIG. 1) comprising a pulser 5 and a pickup 6 for detecting a reference angular phase position is associated with the shaft by which the diesel engine 1 and the fuel injection pump 200 are coupled to each other. A pulse generator 10 comprising a pulser 8 and a pickup 9 for detecting the angular displacement of the plunger 218 of the fuel injection pump 200 is also associated with the same shaft.

The pulser 8 has thirty-six projections or teeth 8' angularly spaced at 10°-intervals for example. If the diesel engine 1 has four cylinders, then nine consecutive teeth of the pulser 8 correspond to one cylinder of the diesel engine 1.

The pulser 5 has one projection or tooth 5' disposed in an angular position between two adjacent ones of the teeth 8' of the pulser 8 and also between two adjacent cam lands on the cam surface 219A of the cam disc 219 of the fuel injection pump 200. The positional relationship of these teeth 8', 5' is illustrated in FIGS. 3(a) and 3(b). By counting the teeth 8' from that tooth 8' which is positioned next to the tooth 5' of the pulser 5, the corresponding cam land of the disc cam 219 and the angular position of the plunger 218 with respect to that cam land can be known, as can be understood from FIGS. 3(a) and 3(b). The numerals put in parentheses in FIG. 3(a) represent the teeth 8'.

The reference phase sensor 7 serves to detect the reference phase position of the output shaft of the diesel engine 1, and the pulse generator 10 serves to detect the angular displacement of the plunger 218 at angular intervals of 10° in the illustrated embodiment.

Each of the fuel injection valves 3 has a needle valve, the lift of which can be detected by a lift sensor 11. The output signal from the reference phase sensor 7 and the output signal from the lift sensor 11 are supplied to an actual injection timing detector 12, which detects an actual fuel injection timing with referenct the output signal from the reference phase sensor 7.

Various engine operating conditions are detected by an accelerator position sensor $13_1$ which detects the depressed position of an accelerator pedal, a water temperature sensor $13_2$ for detecting the temperature of engine cooling water, a fuel temperature sensor $13_3$ for detecting the temperature of the fuel, and a boost pressure sensor $13_4$ for detecting the boost pressure in an intake manifold.

The output signals from the sensors $13_1$ through $13_4$ and the output signal from the pulse generator 10 are supplied to a target injection timing calculating circuit 14 which issues a target injection timing output signal corresponding to each of the cam lands on the cam disc 219. The output signal from the pulse generator 10 is applied to the target injection timing calculating circuit 14 for generating the target injection timing output signal corresponding to each of the cam lands on the cam disc 219 because the target injection timing output signal should be produced in synchronism with selective fuel supply by the fuel injection pump 200 to the fuel injection valves 3. The target injection timing calculating circuit 14 has a memory, for example, which stores, as a multidimensional memory map, the target injection timing output signals with respect to the output signals of the engine operating conditions and the output signals from the pulse generator 10 which indicate the angular displacements of the plunger 218. Each of the target injection timing output signals can therefore be issued by referring to the memory map.

A target injection timing output signal iTref issued from the target injection timing calculating circuit 14 and an actual injection timing output signal iTact detected by the actual injection timing detector 12 are supplied to a pulse timing control circuit 15 which controls the valve closing time of the solenoid valve 226 so that an actual injection timing will coincide with a target injection timing. The pulse timing control circuit 15 then generates a valve closing timing output signal. More specifically, the pulse timing control circuit 15 issues a pulse timing control signal T for a certain period of time after a given number of teeth 8' from the tooth 5' of the pulse 5, e.g., for several msec. after the third tooth 8' from the tooth 5' as shown in FIG. 3(c). Thus, the pulse timing control signal T contains information as to the tooth number and the delay of the signal T from that tooth. The pulse timing control signal T is generated in this manner for each of the cam lands of the cam disc 219, i.e., each of the fuel injection valves 3. Therefore, no problem arises even if the rotational speed of the plunger 218 becomes irregular as a result of fuel injection control.

The opening and closing of the solenoid valve 226 is detected by a valve opening/closing detector 16. A valve closing delay time detector 18 detects a time interval (valve closing delay time Tsdv) from a negative-going edge of a valve drive pulse generated by a pulse generator 17 (the solenoid valve 226 is closed by a lower potential or level, for example, of the drive pulse applied to the solenoid valve 226) to the time when the closing of the solenoid valve 226 is detected by the valve opening/closing detector 16. Likewise, a valve opening delay time detector 19 detects a time interval (valve opening delay time Tedv) from a positive-going edge of a valve drive pulse generated by the pulse generator 17 to the time when the opening of the solenoid valve 226 is detected by the valve opening/closing detector 16. As is conventional, the solenoid valve 226 is judged as being opened even if it is slightly opened.

The output signal from the pulse generator 10 is supplied to a speed detector 20 to detect the rotational speed Np of the output shaft of the diesel engine 1. Based on the engine operating condition output signals from the sensors $13_1$ through $13_4$ and the rotational speed Np, a target injection quantity calculating circuit 21 calculates a target quantity Qref of fuel to be injected. A target valve closing timing calculating circuit 22 calculates a control pulse duration Tv from the rotational speed Np and the target fuel quantity Qref. The rotational speed Np and the target fuel quantity Qref are also supplied to an averaging circuit 23 which determines the arithmetic mean of valve opening delay times Tedv within a certain range of rotational speeds Np and target fuel quantities Qref, i.e., a range in which the vavle opening delay times Tedv are measurable, as indicated by the hatched area in FIG. 4. The arithmetic mean value thus determined up to the preceding cycle is stored and used as a valve opening delay time Tedvm until the supplied data come within the measurable range next time. The mean value is not limited to the arithmetic mean, but may be a running mean or a delay element.

A unit angle signal generator 24 generates a signal indicative of a number of pulses produced from the pulse generator 10 with reference to a pulse from the reference phase sensor 7. The pulses generated by the unit angle signal generator 24 therefore correspond respectively to the successive teeth 8' after the pulse from the reference phase sensor 7, and hence can correspond to the tooth number contained in the signal T issued from the pulse timing control circuit 15, as shown in FIGS. 3(a) and 3(c). FIG. 3(a) shows the output pulses from the unit angle signal generator 24 in relation to the output pulses from the reference phase sensor 7, whereas FIG. 3(c) illustrates the output signal from the pulse timing control circuit 15. It is apparent from FIGS. 3(a) and 3(c) how the output signal T from the pulse timing control circuit 15 is related to the tooth 8'.

The detected valve closing delay time Tsdv, the valve opening delay time Tedvm averaged by the averaging circuit 23, and the control pulse duration Tv calculated by the target valve closing timing calculating circuit 22 are supplied to a pulse duration calculating circuit 25 which then calculates a drive pulse duration Dp according to the equation Dp=Tsdv+Tv−Tedvm.

The output signal from the unit angle signal generator 24, the output signal from the pulse duration calculating circuit 25, and the output signal from the pulse timing control circuit 15 are supplied to the pulse generator 17, which then generates a drive pulse Dp for the solenoid valve 226 with a time delay t0 from the time when the tooth number from the pulse timing control circuit 15 and the output signal from the unit angle signal generator 24 coincide with each other. The duration of the drive pulse is determined by the pulse duration calculating circuit 25. The output pulse signal from the pulse generator 17 is applied via a driver 26 to the solenoid valve 226.

Therefore, the valve closing delay time Tsdv is calculated by the valve closing delay time detector 18, whereas the valve opening delay time Tedv is calculated by the valve opening delay time detector 19. The measured values of the valve opening delay time Tedv are averaged into Tedvm by the averaging circuit 23 within the range in which they can be measured according to the rotational speed and load of the output shaft of the diesel engine 1.

Accordingly, as shown in FIG. 5(a), the valve drive pulse has a time duration Dp (=Tsdv+Tv−Tedvm) from the time when the pulse timing control signal T is generated from the pulse timing control circuit 15. The valve closing delay time Tsdv, the control pulse duration Tv, and the valve opening delay time Tedvm are as illustrated in FIG. 5(c). FIG. 5(b) schematically shows movement of the inner valve of the solenoid valve 226. Although bouncing of the inner valve is not physically eliminated when the valve is opened, the valve opening delay time is accurately measured and the mean value thereof is employed for fuel injection control, the bouncing of the inner valve is made equivalently zero by calculating the drive pulse duration Dp.

Those circuits other than the detecting circuits and driver, e.g., the actual injection timing detector 12, the sensors 13$_1$ through 13$_4$ for detecting the engine operating conditions, the target injection timing calculating circuit 14, the pulse timing control circuit 15, and the circuits 17 through 25 may be replaced with a computer.

Operation of the averaging circuit 23 is shown in FIG. 6. An averaging routine is executed each time one drive pulse for the solenoid valve 226 is issued, i.e., after the amount of fuel to be injected into each engine cylinder is controlled.

When the averaging routine is started, the valve opening delay time is initialized. The initializing step is executed by resetting the count in a register R1 to "0", and the valve opening delay time Tedv is set to an initial value.

Then, a step a determines whether the rotational speed Np is in the range of Npo<Np<Np1, and then a step b determines whether the target fuel quantity Qref is in the range of Qo<Qref<Q1. If the rotational speed Np is in the range of Npo<Np<Np1 in the step a and the target fuel quantity Qref is in the range of Qo<Qref<Q1 in the step b, then they are in the measurable range indicated as hatched in FIG. 4. If the valve opening delaytime Tedv is in the measurable range, the valve opening delay time Tedv is measured in a step c, and then a step d determines whether the measured data is of an abnormal value, i.e., lower than Tedvmin or higher than Tedvmax. If not an abnormal value, then the sum of the value of the register R1 and the measured value opening delay time Tedv is placed in the register R1 in a step e, which is followed by a step f which waits for such addition to be done n times. If added n times, then the value of the register R1 is divided by n to find an arithmetic mean in a step g. Thus, the valve opening delay time Tedvm of the arithmetic mean value is produced in the step g.

In the above embodiment, the valve opening delay time Tedv is measured when it is in the measurable range, and the arithmetic mean value Tedvm is used as the valve opening delay time.

The measurable range may be measured when the rotaional speed Np of the output shaft of the diesel engine is low and the amount of depression of the accelerator pedal is smaller than a prescribed value or the target fuel quantity Qref is smaller than a prescribed value y, i.e., in an idling condition, and the averaged valve opening delay time may be calculated and used for calculating the duration of a drive pulse for the solenoid valve 226.

The measurable range may be determined only in a range in which the rotational speed Np is low, and values of the valve opening delay time may be measured and averaged irrespective of the amount of depression of the accelerator pedal and the target fuel quantity.

Values of the valve closing delay time Tsdv may be averaged.

With the present invention, as described above, the valve opening delay time is substantially measured by a measuring means when at least the rotational speed of the engine is determined to be in a prescribed rotational speed range by a determining means. It is less likely for a valve opening signal to be generated during this time, and the valve opening delay time can accurately be measured.

The measured values of the valve opening delay time are averaged by an averaging means, and the averaged value is used as the valve opening delay time. Therefore, even if error data is included, it is also averaged. As a consequence, the valve drive signal can be set to an accurate duration, and the amount of fuel to be injected can accurately be controlled.

Since the valve opening delay time is not set to a constant value, it can follow a time-dependent change.

Although a certain preferred embodiment has been shown and described, it should be understood that many changes and modifications may be made therein without departing from the scope of the appended claims.

What is claimed is:

1. A solenoid-valve-controlled fuel injection device comprising:

a fuel injection pump having a pump cylinder, a plunger rotatably and reciprocably disposed in said pump cylinder in a fluid-tight manner and defining a fuel pressurization chamber between a distal end of the plunger and the pump cylinder, a drive shaft rotatable in synchronism with an output shaft of an internal combustion engine, means responsive to rotation of said drive shaft for reciprocably displacing said plunger to pressurize fuel in said pressurization chamber, and a fuel chamber for being supplied with fuel from a fuel tank in response to rotation of said drive shaft, whereby the pressurized fuel can be fed into cylinders of said internal combustion engine;

a solenoid valve for selectively opening and closing a communication passage by which said pressurization chamber and said fuel chamber communicate with each other;

valve opening delay time detecting means for detecting a valve opening delay time of said solenoid valve;

valve closing delay time detecting means for detecting a valve closing delay time of said solenoid valve;

valve closing period calculating means for calculating a valve closing time of said solenoid valve according to operating conditions of said internal combustion engine;

target fuel injection time calculating means for calculating a target fuel injection time according to the operating conditions of said internal combustion engine;

determining means for determining whether at least a rotational speed of said internal combustion engine is in a predetermined rotational speed range; and averaging means for averaging valve opening delay times detected by said valve opening delay time detecting means when said rotational speed is determined to be in said rotational speed range by said determining means, whereby a drive pulse having a pulse duration determined in view of the valve opening delay time averaged by said averaging means is applied to said solenoid valve.

2. A solenoid-valve-controlled fuel injection device according to claim 1, wherein said valve opening delay time detecting means comprises valve opening detecting means for detecting opening of said solenoid valve and detecting means for detecting the difference between a valve opening detecting output from said valve opening detecting means and the time at which a valve opening edge of the drive pulse applied to said solenoid valve.

3. A solenoid-valve-controlled fuel injection device according to claim 1, wherein said valve closing delay time detecting means comprises valve closing detecting means for detecting closing of said solenoid valve and detecting means for detecting the difference between a valve closing detecting output from said valve closing detecting means and the time at which a valve clsoing edge of the drive pulse applied to said solenoid valve.

4. A solenoid-valve-controlled fuel injection device according to claim 1, wherein said valve closing period calculating means comprises target fuel injection quantity calculating means for calculating a target quantity of fuel to be injected from a signal indicative of a rotational speed of said plunger and a signal indicative of the operating conditions of said internal combustion engine, and target valve closing period calculating means for converting the target quantity of fuel calculated by said target fuel injection quantity calculating means to a closing period of said solenoid valve.

5. A solenoid-valve-controlled fuel injection device according to claim 1, wherein said averaging means comprises averaging means for obtaining an arithmetic mean of the valve opening delay times detected by said valve opening delay time detecting means.

6. A solenoid-valve-controlled fuel injection device according to claim 1, wherein said averaging means comprises averaging means for obtaining a running mean of the valve opening delay times detected by said valve opening delay time detecting means.

* * * * *